United States Patent [19]

Hansen

[11] 4,381,930

[45] May 3, 1983

[54] CYCLONE SEPARATOR FOR SEPARATING PARTICULATE MATERIAL, IN PARTICULAR SEED, FROM AN AIR FLOW

[75] Inventor: Jens O. E. Hansen, Fuglebjerg, Denmark

[73] Assignee: Kongskilde Koncernselskab A/S, Sorø, Denmark

[21] Appl. No.: 379,459

[22] Filed: May 18, 1982

[30] Foreign Application Priority Data

Jun. 12, 1981 [DK] Denmark ............................ 2578/81

[51] Int. Cl.³ ............................................. B01D 45/12
[52] U.S. Cl. .................................. 55/339; 55/459 R; 209/144
[58] Field of Search .................................. 55/338-340, 55/450, 452, 458, 459 R, 459 A, 459 B, 459 C, 459 D, 460, 337, DIG. 37; 209/144, 211; 210/512.1

[56] References Cited

U.S. PATENT DOCUMENTS

| | | | |
|---|---|---|---|
| 1,897,195 | 2/1933 | Howden | 55/459 R |
| 2,153,270 | 4/1939 | Osgood | 55/339 |
| 2,290,664 | 7/1942 | Allardice | 55/338 |

Primary Examiner—Bernard Nozick
Attorney, Agent, or Firm—Anthony A. O'Brien

[57] ABSTRACT

In a centrifugal separator, in particular for separating light materials, such as grass seed, from an air flow, a whirl chamber is provided between a circumferential wall of the separator casing and a radially inner filter consisting of a louvred shell imparting a change of direction of about 180° to the air flow on its way from the whirl chamber to the air outlet of the casing, thereby creating within the shell a counter-rotating whirl of air and material passed through the slits together with air.

To separate such material from the air, the shell is provided with a vertically extending slot associated with an ejector rail adapted to remove the outer portions of the counter-rotating whirl and feed them back for renewed separation in the whirl chamber of the separator casing. The slits may then be given such a size that they will not be blocked up by the material or give rise to an increased loss of pressure, as the ejector rail provides for regaining the material passed through the slits.

3 Claims, 1 Drawing Figure

U.S. Patent
May 3, 1983
4,381,930
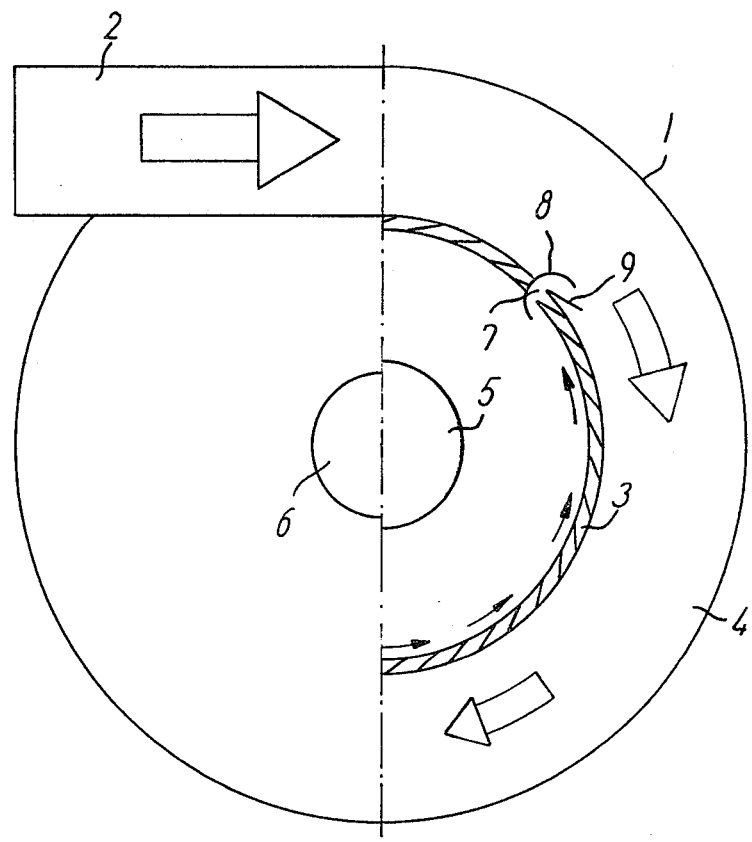

CYCLONE SEPARATOR FOR SEPARATING PARTICULATE MATERIAL, IN PARTICULAR SEED, FROM AN AIR FLOW

FIELD AND BACKGROUND OF THE INVENTION

This invention relates to a cyclone separator for separating particulate material, in particular seed, from an air flow, including a filter inserted between the external whirl chamber of the separator casing and its axial air outlet, said filter comprising a shell of louvred plate material, the slits of which reckoned radially outwards incline in the rotational direction of the air in the whirl chamber.

Cyclone separators of the above mentioned type are for example used in connection with suction-pressure-blowers for the conveyance of grain and seed and the louvred plate filter has for its purpose to intensify the separation of the conveyed material from the air flow due to the fact that the rotational direction of the air is so to speak reversed when passing through the slits.

When such cyclone separators are used for treating an air flow containing comparatively light materials, such as grass seed (contrary to the general cereals), it has been difficult to cause the material to fall out of the cyclone and to prevent the filter from clogging up. This tendency to block up may of course by counteracted by increasing the flow passage of the slits, but in that case a considerable quantity of the light material will follow the air through said slits and so be lost, or it will together with the air pass through the blower associated with the cyclone separator, thereby exposing said blower to wear.

SUMMARY OF THE INVENTION

The present invention eliminates said drawbacks in that the louvred plate shell has at least one slot extending over at least part of the axial length of the shell and associated with an ejector rail protruding from the inner surface of the shell and adapted to remove the outer portions of the counter-rotating volume of air within the filter and recycling the removed air and the material contained therein into the whirl chamber.

The counter-rotating air movement within the louvred plate shell is caused by the above mentioned reversing of the air direction of the air flow on passing through the slits, thereby inducing a secondary movement within the filter accompanied by a renewed separation between the air and the material carried along with it. This material shows a tendency to circulate along the inner surface of the louvred plate shell so as to be caught by said ejector rail which then returns the material to the external whirl chamber for a repeated treatment.

According to the invention it is preferred that the ejector rail has an approximately semi-circular cross-section and that its longitudinal edge portions project from both sides of the louvred plate shell. In this case the external longitudinal edge portion of the ejecting rail will cover the slot against the air rotating in the whirl chamber and will also cause the removed quantity of air to move in a manner coinciding more or less with the air movement in said chamber.

It is further preferred that the louvred plate shell at the free edge of the slot carries a guiding rail diverging from the shell and located beneath the external longitudinal edge portion of the ejector rail. In cooperation with this edge portion the guiding rail may form a well-defined exhaust slot with ejector effect on the removed air so as to eliminate its tendency to flow along the outer surface of the slit plate shell.

BRIEF DESCRIPTION OF THE DRAWING

The drawing illustrates a preferred embodiment of the cyclone separator according to the invention, said cyclone separator being shown in plan view and partially in section.

DETAILED DESCRIPTION OF THE PREFERRED EMBODIMENT

The illustrated separator comprises a casing having a substantially cylindrical circumferential wall 1 with a tangential inlet 2, and a louvred plate shell 3 that is concentric with the wall 1 and together therewith constitutes an external whirl chamber 4 in which the substantial part of the separation between the conveying air and the material, such as grass seed, carried along with it takes place. The circumferential wall 1 merges as its base into a bottom cone with a central outlet 5 for the separated material.

In order to reach an axial outlet 6 at the top of the casing formed by the wall 1 the air has to flow through the louvred plate shell 3, the slits of which incline in their outward direction, as schematically shown on the drawing, in the rotational direction of the air in the whirl chamber 4, thereby contributing to subjecting the air on its way inwards through the slits to a change of direction of about 180° so as to create a secondary, counter-rotating whirl within the shell 3. Seed or other material that may have passed through the slits together with the air will in this secondary whirl be centrifuged outwardly towards the internal side of the shell and circulate in the direction shown by arrows inside the shell.

At one or more points the shell 3 presents a more or less vertical slot 7 which on the drawing is supposed to be parallel with the axis of the cyclone separator, but which may also have a more or less helical course and may possibly comprise separate sections covering together the height of the shell. An ejector rail 8 is fastened along the edge of said slot 7 nearest to the inlet 2, said rail having a semi-circular cross-section, the concavity of which faces away from the inlet. The internal longitudinal edge portion of said ejector rail 8 protrudes somewhat from the inner side of the louvred plate shell 3, thereby removing the outer portions of the above mentioned secondary whirl, and the external longitudinal edge portion of the rail deviates the removed air flow in the direction of the primary whirl in the chamber 4.

Along the opposite edge of the slot 7 there is externally of the shell secured a guiding rail 9 pointing somewhat outwards in the whirl chamber 4, thereby facilitating the removed air flow to be mixed with the primary air flow.

I claim:

1. A cyclone separator for separating particulate material, such as seed, from an air flow, comprising
   a separator casing having a circumferential wall forming the radially outer boundary of a whirl chamber,
   an axial air outlet from said casing, and a filter member arranged between said circumferential wall and said outlet and forming a radially inner boundary of said whirl chamber, said filter member comprising a shell of louvred plate, the slits of which reckoned radially outwardly incline in the intended rotational direction of the air entering said whirl chamber, and said plate having at least one slot extending over at least part of the axial length of the shell and associated with an ejector rail protruding on the inner surface of said shell and adapted to remove the outer portions of a counter-rotating volume of air inside said shell and to recycle the removed air and particulate material contained therein into said whirl chamber.

2. A cyclone separator as claimed in claim 1, wherein said ejector rail has an approximately semi-circular cross-section and protrudes on both sides of said shell of louvred plate.

3. A cyclone separator as claimed in claim 2, wherein said ejector rail has its convex side secured to one longitudinal edge of said slot, and wherein a guiding rail is provided on the shell adjacent the other longitudinal edge of said slot, said guiding rail diverging outwardly from said shell and being located behind the external longitudinal edge portion of the ejector rail.

* * * * *